April 7, 1964   H. E. LUEBKEMANN   3,127,758
COUPLING FOR PRECISION GRINDING MACHINE APPARATUS
Filed May 11, 1962   2 Sheets-Sheet 2

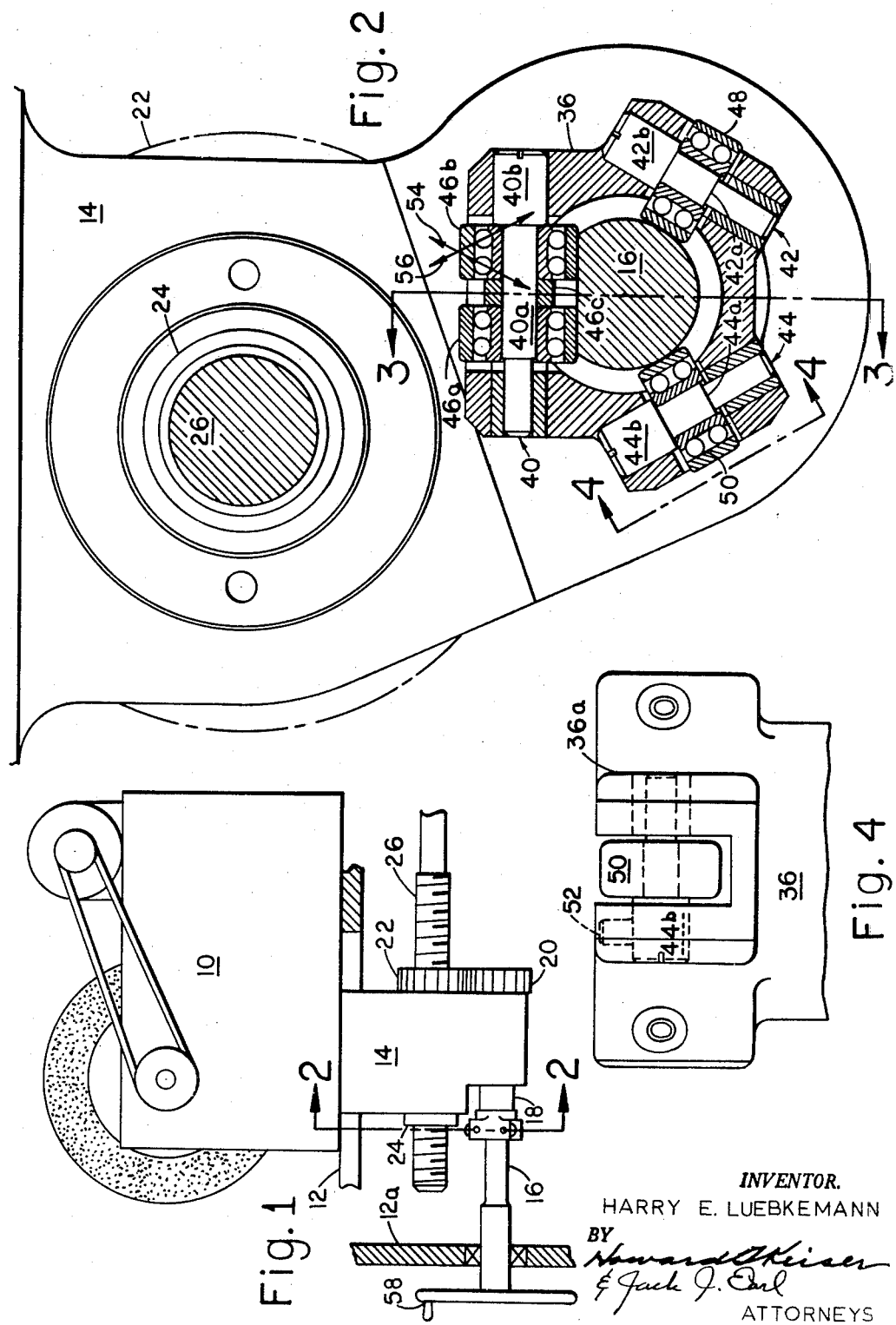

United States Patent Office 3,127,758
Patented Apr. 7, 1964

3,127,758
COUPLING FOR PRECISION GRINDING
MACHINE APPARATUS
Harry E. Luebkemann, Cincinnati, Ohio, assignor to The
Cincinnati Milling Machine Co., Cincinnati, Ohio, a
corporation of Ohio
Filed May 11, 1962, Ser. No. 193,968
3 Claims. (Cl. 64—23.7)

This invention relates to a transmission mechanism for a machine tool and more particularly to a coupling mechanism for transmitting rotary motion from one member to another in a grinding machine feed mechanism.

A splined coupling is a common method for connecting a shaft to drive another rotatable member in a combination where the shaft and rotatable member are relatively axially movable. An example of such a coupling is an externally splined handwheel shaft which drives an internally splined gear journalled for rotation in the wheelhead of a precision grinding machine. The splined gear drives a nut which is also journalled in the wheelhead and which is received over a fixed screw. Therefore, as the handwheel is rotated, the wheelhead is caused to move carrying the splined gear axially along the splined shaft. While these splined connections are commonly used, they have disadvantages which can affect the accuracy of a precision grinding machine. There must be a relative looseness in a splined coupling to allow for free axial movement between coupled members. This looseness results in backlash in the drive when the direction of rotation is reversed. Also, slight axial misalignments between the coupled members will cause the members to drag on one another when they are axially moved. The drag between members tends to produce stick-slip motion and the smoothness of movement is adversely affected. Slight misalignments occur often in machines such as precision grinding machines due to the wearing in of the wheelhead slides as the machine is operated through repeated cycles. Both the backlash and stick-slip characteristics are very objectionable in precision grinders due to the extreme accuracy of movements required of the components in the machines.

It is therefore an object of this invention to provide a relatively axially movable coupling for a grinder feed mechanism in which backlash producing clearances can be eliminated.

Another object of this invention is to provide a coupling mechanism for relatively axially movable members in which movement is not affected by misalignment due to machine wear.

A still further object is to provide a grinding machine feed mechanism with a coupling mechanism in which the relative looseness between driving and driven members may be adjusted.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, the feed mechanism of this invention has a sleeve which is loosely received over the end of a shaft. The sleeve and shaft are relatively axially movable. The shaft has a flat surface which extends therealong for a distance equal at least to the range of relative axial movement. The sleeve has a set of cylindrical rollers journalled for rotation on axles which are transverse to the longitudinal axis of the shaft and sleeve. One of the rollers is engaged to roll along the flat surface as the shaft and sleeve are relatively axially moved. The other rollers are engaged to roll along the cylindrical surface of the shaft and hold the flat shaft surface and one roller in uniform contact with each other. The rollers are received over eccentric diameters of the axles. The axles are releasable in the sleeve and rotatably adjustable to swing the eccentric diameters to alter the contact pressure between the rollers and shaft. All of the axles are at the same axial location along the sleeve so that the contact points of the rollers on the shaft lie substantially in a single plane transverse to the shaft.

A clear understanding of the construction and operation of this invention can be obtained from the following detailed description in which reference is made to the attached drawings wherein:

FIG. 1 is a simplified schematic representation of a grinding machine wheelhead and feed screw mechanism.

FIG. 2 is a true section of the coupling mechanism as it would appear on line 2—2 of FIG. 1.

FIG. 4 is a partial elevation of the coupling mechanism as viewed from line 4—4 of FIG. 2.

Figure 3:
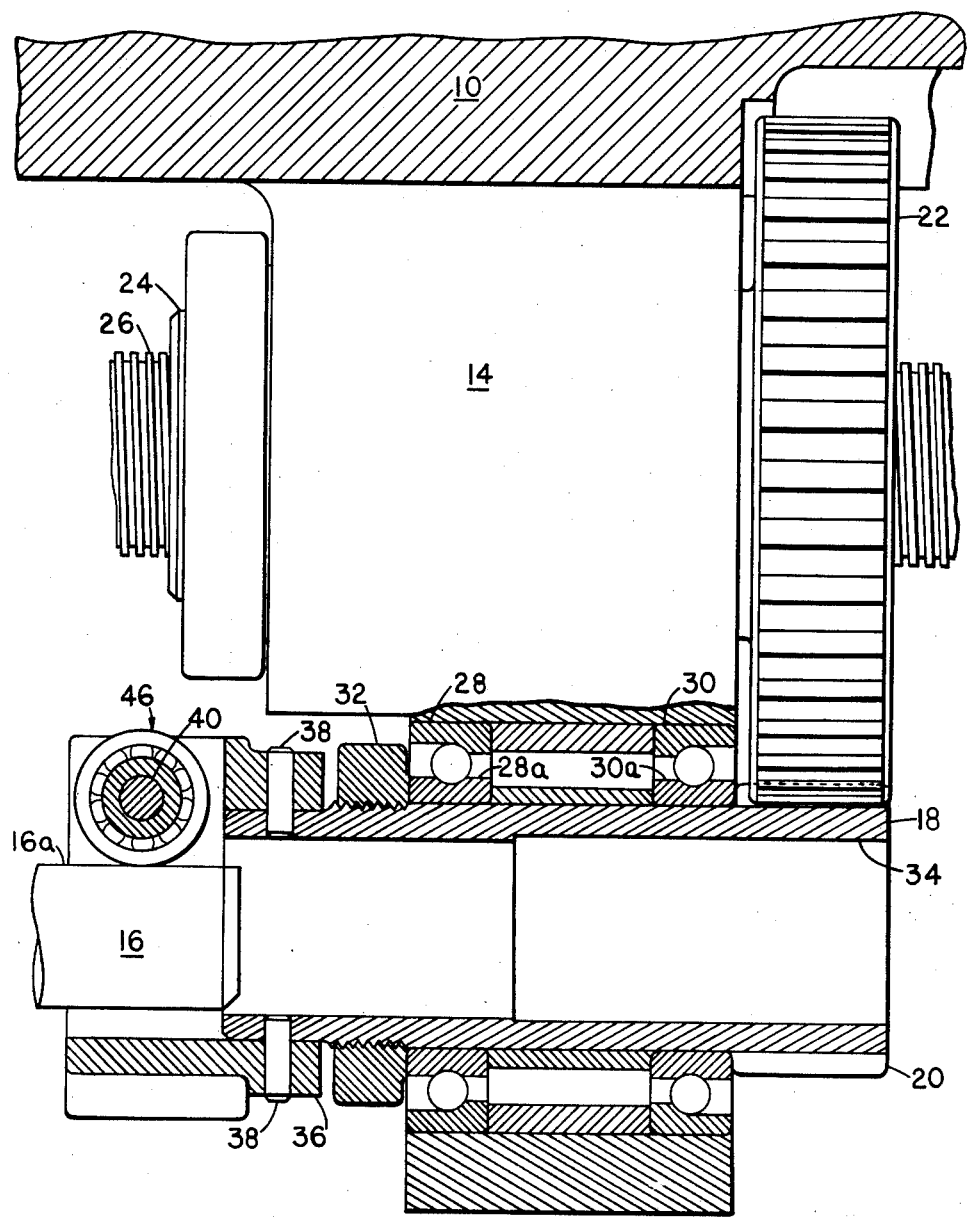
FIG. 3 is a section of the coupling mechanism taken on line 3—3 of FIG. 2.

As shown in FIG. 1, the grinding machine wheelhead 10 is received on the base 12 for sliding movement to the left and back to the right as viewed in that figure. A yoke 14 extends from the bottom of the wheelhead 10 into the base 12. A handwheel shaft 16 extends from the front portion 12a of the base 12 through a sleeve 18 which is journaled for rotation in the lower part of the yoke 14. A gear 20 is fixed on the sleeve 18 and engages a gear 22. The gear 22 is fixed on the end of a nut 24 that is journalled in the yoke 14 above the sleeve 18. A fixed feed screw 26 is in threaded engagement through the nut 24. When the nut 24 is rotated, the wheelhead 10 is moved on the base 12 and the sleeve 18 and shaft 16 move relative to one another in a telescoping manner.

The coupling mechanism between the shaft 16 and sleeve 18 is best seen in FIGS. 2 and 3. The sleeve 18 is journalled for rotation in the annular bearings 28, 30 fixed in the yoke 14. The gear 20 is integral with the sleeve 18 on one end and a retaining collar 32 is in threaded engagement over the sleeve 18 at the other end. The collar 32 and gear 20 are held against the inner bearing races 28a, 30a, respectively, to axially fix the sleeve 18 in the yoke 14. The sleeve 18 has a double diameter clearance opening 34 therethrough which is adapted to loosely receive the end of the handwheel shaft 16. A sleeve extension 36 is fixed to the end of the sleeve 18 over the shaft 16 by pins 38.

The sleeve extension 36 has a set of axles 40, 42, 44 received therein and spaced therearound at the same axial location along the sleeve 18. A double drive roller 46, comprised of the spaced cylindrical ball bearing rollers 46a, 46b, and the spacer 46c, is received over the axle 40. The spaced rollers 46a, 46b are engaged with the shaft 16 to straddle and roll on a flat surface 16a which extends along the shaft 16. Each of the axles 42, 44 has a ball bearing roller 48, 50 respectively, which is in contact with the cylindrical surface of the shaft 16. Each of the axles 40, 42, 44 has an eccentric diameter 40a, 42a, 44a over which the rollers 46, 48, 50 are received. Each of them also has a slotted head portion 40b, 42b, 44b for pivotally adjusting the axles in the sleeve extension 36. As shown in FIG. 4, the axle 44 is received through a lobe 36a of the extension 36. The locking screw 52 is in threaded engagement through the lobe 36a and is adapted to be tightened against the head portion 44b when the axle 44 has been pivotally adjusted to bring the roller 50 into the proper preload contact with the shaft 16. Each of the other axles 40, 42 is similarly locked in an adjusted position by a screw 52.

It can be seen from FIG. 2, that the rollers 48, 50 hold the shaft 16 firmly in contact with the roller portions 46a, 46b. The rollers 46, 48, 50 may be adjusted to provide considerable preloading force against the shaft 16 when the shaft and sleeve are in the static condition. In addition, the rollers 46, 48, 50 are pre-stressed in the direction of the lines 54, 56 as indicated for the roller 46a. Therefore the rollers themselves act as rigid units and the preloading of their contact with the shaft 16 insures that the contact between the drive roller 46 and the flat shaft surface 16a will be uniform and tight as the shaft 16 is rotated in one and the other directions by the handwheel 58. The actual transmission of the torque from the shaft 16 to the sleeve extension 36 and sleeve 18 is through the double roller 46. Since there is uniform contact between that roller and the shaft 16, there is no backlash between the two when the direction of rotation is reversed. Since the contact between the shaft 16 and rollers 46, 48, 50, is rolling contact, the relative axial movement can still be rather freely accomplished. The problem of stick-slip is minimized due to the rolling contact.

The condition of axial alignment of the shaft 16 with the sleeve 18 is not critical. Slight changes in the height of the wheelhead 10 on the base 12 due to wearing in of sliding surfaces may still cause some misalignment, but this will only produce a slight change in the preloading of the rollers 46, 48, 50 since the plane in which their points of contact are contained would intersect the shaft 16 on only a very slightly eliptical section. The rolling contact without sliding contact would be maintained. Of course, since the axles 40, 42, 44 are readily releasable for adjustment, should the misalignment produce excessive forces, the rollers 46, 48, 50 could be slightly shifted to reduce the preloading.

Another alignment feature is obtained from the use of but one flat surface 16a on the shaft 16. There is no problem of insuring that the axles 40, 42, 44 are spaced around the extension 36 in accurate relationship. Only one axle, 40, needs to be in exact alignment with a flat surface 16a and the shaft 16 will align itself as the rollers 46, 48, 50 are brought into forcible contact with the shaft 16. This gives better control of the stresses within the sleeve extension 36 since the stresses from the roller preload are effective in predetermined directions and are all adjustable in magnitude.

What is claimed is:

1. In a precision grinding machine having a wheelhead movable on a base by operation of a feed mechanism, the feed mechanism comprising in combination:

(a) a drive shaft rotatably supported in the base and having a flat surface along one side thereof,
(b) a drive sleeve rotatably supported from the wheel head having a clearance opening therethrough adapted loosely to receive said shaft for relative movement in a telescoping manner when the wheelhead is moved,
(c) a drive roller rotatably received in said sleeve for rotation on an axis transverse to the drive shaft and adapted to engage and roll along said flat surface and to transmit torque between said shaft and sleeve for rotation thereof together,
(d) a plurality of aligning rollers rotatably received in said sleeve and adapted to engage and roll along the cylindrical surface of said shaft to hold said said flat surface firmly in contact with said drive roller,
(e) means to adjust said drive and aligning rollers transversely relative to said shaft to adjust the contact pressure therebetween to maintain uniform contact when said shaft and sleeve are rotated in one and the other directions, and
(f) means responsive to rotation of said sleeve correspondingly to move the wheelhead on the base.

2. The feed mechanism of claim 1 wherein said means to adjust said drive and aligning rollers is:

(a) a set of transverse axles releasably fixed in and spaced around said sleeve at a common axial location on said sleeve,
(b) each of said axles having an eccentric diameter portion on which one of said rollers respectfully is received for rotation, said eccentric diameter portions being angularly adjustable when said axles are released and turned in said sleeve to adjust said contact pressure between said rollers and drive shaft.

3. The feed mechanism of claim 2 wherein said drive roller comprises:

(a) two spaced cylindrical bearing members journalled on the eccentric diameter portion of one of said axles and spaced apart to roll along the sides of said flat surface of the drive shaft, each of said two bearing members prestressed in oblique directions relative to the axis of the axle on which it is mounted thereby to reduce backlash in the mechanism when said shaft is rotated in one and the other directions.

References Cited in the file of this patent

UNITED STATES PATENTS

| | | |
|---|---|---|
| 672,613 | Carter | Apr. 23, 1901 |
| 1,656,456 | Trout | Jan. 17, 1928 |
| 2,346,958 | Abegg | Apr. 18, 1944 |
| 2,493,856 | Buhler | Jan. 10, 1950 |
| 2,777,670 | Long | Jan. 15, 1957 |